Dec. 7, 1965
E. F. BRENNOM
3,221,944
PORTABLE MIXING AND POURING DEVICE FOR
FLOWABLE MOLDING MATERIAL
Filed July 6, 1964
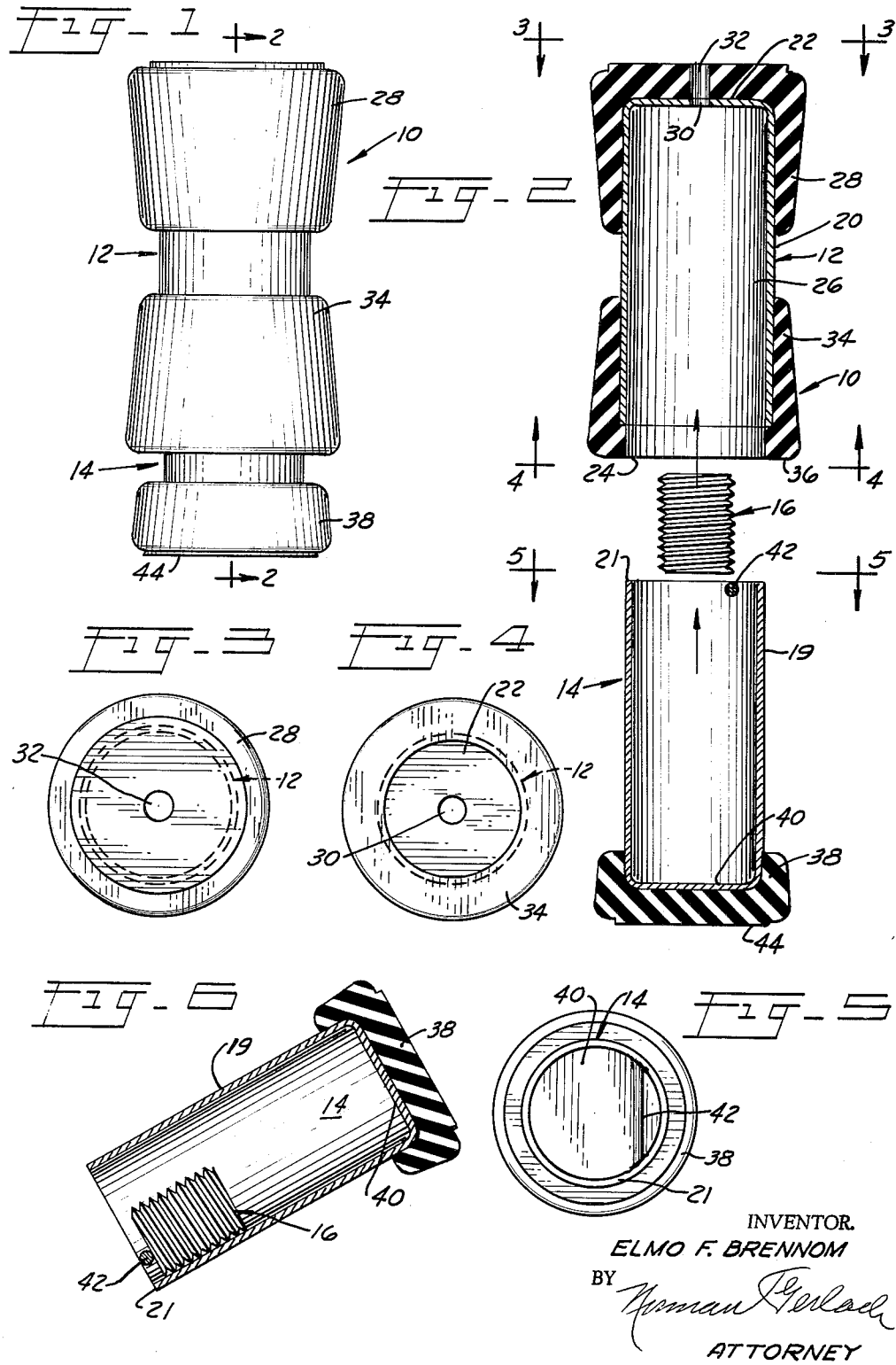
INVENTOR.
ELMO F. BRENNOM
BY
ATTORNEY United States Patent Office 3,221,944
Patented Dec. 7, 1965

3,221,944
PORTABLE MIXING AND POURING DEVICE FOR FLOWABLE MOLDING MATERIAL
Elmo F. Brennom, 957 N. Court St., Rockford, Ill.
Filed July 6, 1964, Ser. No. 380,415
7 Claims. (Cl. 222—190)

The present invention relates to a new and useful portable mixing and pouring device for flowable molding material and has particular reference to such a device wherein means are provided for placing the mixing chamber under vacuum.

The mixing and pouring device of the present invention has been designed for use particularly in connection with the casting of dental inlays and certain forms of restorative castings. The invention is, however, capable of other uses and the same may, with or without modification, be employed in connection with the casting of items of jewelry and small precision machine or instrument parts. Irrespective, however, of the particular use to which the invention may be put, the essential features thereof are always preserved. In the interests of providing a suitable exemplary disclosure, the invention will be illustrated and described herein in connection with prosthetic dental work, such, for example, as the formation of dental inlays.

By way of introduction to the causes which have given rise to the present invention, it is pointed out that in duplicating a wax pattern for the creation of a gold inlay or the like, it is invariably the practice to mount the pattern upon a suitable sprue-forming wire and then coat the pattern with a viscous but flowable investment mixture. Considerable skill is required in the application of the coating of investment mixture in order to prevent the occlusion of air bubbles either in the mixture or between the mixture and the wax pattern since such bubbles will create imperfections in the inlay that is formed by way of the pattern. After coating, the wax pattern is placed within the usual casting cup and the latter is filled by a pouring operation with an investment mixture which may be the same in formulation as the painting investment mixture and, upon hardening, forms a mold about the pattern. This mold, after removal of the wax therefrom by a melting process, is employed for the casting in gold or other suitable metal of a duplicate of the wax pattern. The investment mixture which is poured into the casting cup frequently contains a large number of air bubbles which, although not readily visible, cause imperfections in the mold and, consequently, defects in the inlay or other article that is produced therein.

To obviate the presence of these air bubbles in the investment mixtures that are employed in connection with dental inlay work, various types of mixers are employed in dental offices and laboratories whereby the mixing of the investment materials is effected under vacuum. These mixers vary widely in their construction and most of them are of a relatively complicated nature. Many of them employ stirring or agitating paddles, coupled with vacuum fittings whereby the mixing bowls or chambers may be connected to independent sources of vacuum which are applied during the mixing operation. Pouring of the investment mixture from the mixing bowl into the casting cup is frequently a difficult operation, and thus, some mixers are of a combination mixing and pouring type wherein the mixture in the form of mixed investment materials is channeled to the casting cup through valved passages. Valve mechanisms also are required for turning on and shutting off the vacuum supply. Obviously, such mixers as employ paddles, valves and passages for the investment mixture are cumbersome and, moreover, are difficult to clean. Still further, such mixers are not portable in the sense that they may be readily transported within the office or laboratory and to and from a wash basin, water supply or towel rack.

The present invention is designed to overcome the above-noted limitations that are attendant upon the construction and use of present-day mixers which are specifically for use with investment mixtures and are designed for dental inlay work or the like; and toward this end, there is contemplated an extremely simple three-piece mixing and pouring device which weighs but a few ounces, requires no support and, hence, may be manipulated in the hands of the user, establishes its own source of vacuum under the influence of manual pressure, facilitates pouring of the mixed investment material from the mixing chamber directly into a separate casting cup, and may be cleaned by a rinsing operation involving the simple expedient of holding the three component parts under running water issuing from a faucet.

The provision of such an investment mixing and pouring device constitutes the principal object of the invention. Ruggedness, durability, ease of operation, low cost of manufacture, simplicity of design, attractiveness of appearance, and the establishment of a vacuum seal during the mixing operation to prevent spillage, are further desirable features which have been borne in mind in the production and development of the present invention.

Other objects and advantages of the invention, not at this time enumerated, will readily suggest themselves as the following description ensues.

In the accompanying single sheet of drawings forming a part of this specification, one illustrative embodiment of the invention is shown.

In this drawing:

FIG. 1 is a side elevational view of a portable mixing and pouring device in accordance with the principles of the present invention;

FIG. 2 is an exploded sectional view taken substantially along the line 2—2 of FIG. 1;

FIG. 3 is a top plan view of the device;

FIG. 4 is an end elevational view of the main body section of the device as viewed from the position indicated by the line 4—4 of FIG. 2;

FIG. 5 is an end elevational view of the pouring cup section of the device as viewed from the position indicated by the line 5—5 of FIG. 2; and FIG. 6 is a side elevational view, partly in section, of the pouring cup section, showing the same in operation.

Referring now to the drawings in detail, a portable pouring and mixing device constructed according to the principles of the present invention is shown in its assembled condition in FIG. 1 and is designated in its entirely by the reference numeral 10.

As shown in FIG. 2, the device comprises a two-part separable container and an internal loose weighted agitator, the container including an upper section 12 and a lower section 14 and the agitator being designated or identified by the reference numeral 16.

The upper section of the container is in the form of an inverted deep drawn steel or other metal cup and constitutes the main body section of the container. The lower section 14 is in the form of an upright deep drawn steel or other metal cup and constitutes the pouring cup section of the container. The agitator 16 is in the form of a short length of threaded solid rod stock and is preferably formed of stainless steel or brass. The cylindrical side wall 19 of the lower container section 14 is adapted to be telescopically received within the cylindrical side wall 20 of the upper section and when the two sections are fully assembled upon each other so that the open circular rim 21 of the lower section engages the top or end wall 22 of the upper section, a short length of the lower section 14 projects downwardly beyond the open circular rim 24 of the upper section as shown in FIG. 1. The container, when thus assembled, is in effect, an enlarged counterpart of a conventional gelatine-type medicine capsule and affords an internal variable volume mixing chamber 26.

The upper section 12 of the container is provided with a relatively thick crown 28 of rubber or other suitable elastomeric material, and small registering passages or venting openings 30 and 32 are formed respectively in the central portions of the container top or end wall 22 and the crown 28 and normally establish communication between the chamber 26 and the ambient atmosphere. A relatively thick protective rim band 34 of rubber or similar material extends around the lower end portion of the upper container section 12 and has its lower rim 36 flush with the rim 24.

The lower section 14 of the container is provided with a relatively thick base cup 38 which is similar to the crown 28. Both this base cup and the bottom or end wall 40 of the lower container section 14 are imperforate. A retaining bar 42 (see FIGS. 2 and 5) extends across the end portion of the lower container section in secant fashion and prevents ejection of the agitator 16 when the lower section 14 is removed from the upper section 12 and employed as a pouring cup.

The crown 28, the band 34, and the base cup 38 are vulcanized or otherwise suitably bonded to the respective steel parts to which they are applied.

In the operation of the combined mixing and pouring device 10, the upper and lower sections 12 and 14 of the container are first separated, the agitator 16 being left in the lower section 14. The required amounts of water and investment powder are then introduced into the lower container section, and thereafter, the upper container section is telescoped over the lower container section to the fullest extent of which it is capable. The operator or technician then closes the passages or openings 30 and 32 by placing a finger or any other part of the hand over the passage 32. Thereafter, the operator, utilizing one hand, agitates the thus loaded container by shaking it violently. Ordinarily, where standard or conventional investment materials are concerned, from twenty to thirty seconds will suffice for the agitation period.

At the conclusion of the agitating step or operation, vacuum is applied to the chamber 26. This is accomplished by the simple expedient of slowly pulling the two sections 12 and 14 apart while maintaining the passages or openings 30, 32 closed. The two rims 21 and 24 are brought into approximate contiguity without actually separating the container sections and the thus created vacuum is maintained for a few seconds which is sufficient to remove occluded bubbles from the thoroughly mixed investment materials within the chamber 26.

Immediately prior to complete separation of the two sections 12 and 14, the operator will lift his finger or other part of the hand from the passage or opening 32 in order to relieve the vacuum and thus make it possible to separate container sections with ease.

Since the rubber or elastomeric base cup 38 is provided with a flat underneath base surface 44 (see FIGS. 1 and 2), the lower container section 14 is possessed of a degree of stable equilibrium so that it may rest in self-supporting upright fashion on a table or other working surface, and thus, enable the operator to have access to the mixed investment materials within the section for painting of a wax inlay or other pattern. After such painting of the pattern has been completed, the section 14 is employed as a pouring cup, preferably with vibratory agitation in the usual manner of use of pouring cups, the only precaution necessary being to make certain that the retaining bar 42 is in a horizontal position in the lower region of the pouring rim 21 as shown in FIG. 6. In such a position, the retaining bar will restrain the agitator 16 and prevent it from being ejected from the pouring cup with the mixed investment materials.

From the above description, it is believed that the construction, use and advantages of the herein described combined mixing and pouring device will be apparent without further description. It is to be noted, however, that the device is not necessarily limited to use in the precise manner set forth above and that alternative methods of use may be resorted to according to the judgment of the operator. For example, agitation may under certain circumstances be resorted to with the contents of the chamber 26 under vacuum. This may readily be accomplished by pulling the two sections axially in opposite directions until the rims 21 and 24 are disposed in close proximity to each other with the passages 30 and 32 closed as heretofore described and then holding such a position of the sections during manual shaking of the container. Whether the creation of vacuum within the container be resorted to before or during agitation, it will be understood that the presence of moisture within the investment material will enhance the vacuum seal which exists between the telescopic cylindrical side walls of the upper and lower container sections 12 and 14.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A combined mixing and pouring device for plastic materials comprising: a composite two-part separable capsule-like container including an upper cup-shaped section and a lower cup-shaped section, each section presenting an end wall and an outstanding continuous side wall with a continuous open rim, the side wall of the lower section being telescopically receivable within the side wall of the upper section with a snug fit, said sections when telescopically assembled upon each other providing an internal variable volume mixing chamber for the plastic materials, there being a small venting opening in the end wall of the upper section adapted to be manually closed by the pressure application thereto of the finger or other part of the hand of an operator, the assembled container, when subjected to a manual shaking operation with said opening closed and the sections in any selected position of telescopic relationship, serving to intermix the plastic materials within the chamber, said sections when drawn apart so as to increase the volume of said variable volume mixing chamber and with said opening closed, serving to place the interior of the chamber under vacuum so as to express occluded gases from the plastic materials within the chamber, and a weighted agitator disposed loosely within the telescopically-assembled container and adapted to enhance the mixing action of the container during a container-shaking operation.

2. A combined mixing and pouring device for plastic materials comprising: a composite two-part separable capsule-like container including an upper cup-shaped section and a lower cup-shaped section, each section presenting an end wall and an outstanding continuous side wall with a continuous open rim, the side wall of the lower section being telescopically receivable within the side wall of the upper section with a snug fit, said sections when telescopically assembled upon each other providing an internal variable volume mixing chamber for the plastic materials, there being a small venting opening in the end wall of the upper section adapted to be manually closed by the pressure application thereto of the finger or other part of the hand of an operator, the assembled container, when subjected to a manual shaking operation with said opening closed and the sections in any selected position of telescopic relationship, serving to intermix the plastic materials within the chamber, said sections when drawn apart so as to increase the volume of said variable volume mixing chamber and with said opening closed, serving to place the interior of the chamber under vacuum so as to express occluded gases from the plastic materials within the chamber, a cup-shaped crown of elastomeric material fitting over the upper end of the upper section and bonded to the wall surfaces thereof, there being a venting opening in said crown in register with, and constituting a continuation of, the venting opening in the end wall of the upper section, and a similar cup-shaped base of elastomeric material fitting over the lower end of said lower section of the container.

3. A combined mixing and pouring device for plastic materials comprising: a composite two-part separable capsule-like container including an upper cup-shaped section and a lower cup-shaped section, each section presenting an end wall and an outstanding continuous side wall with a continuous open rim the side wall of the lower section being telescopically receivable within the side wall of the upper section with a snug fit, said sections when telescopically assembled upon each other providing an internal variable volume mixing chamber for the plastic materials, there being a small venting opening in one wall of the upper section adapted to be manually closed by the pressure application thereto of the finger or other part of the hand of an operator, the assembled container, when subjected to a manual shaking operation with said opening closed and the sections in any selected position of telescopic relationship, serving to intermix the plastic materials within the chamber, said sections when drawn apart so as to increase the volume of said variable volume mixing chamber and with said opening closed, serving to place the interior of the chamber under vacuum so as to express occluded gases from the plastic materials within the chamber, a weighted agitator disposed loosely within the telescopically assembled container and adopted to enhance the mixing action of the container during shaking of the latter, and a retaining element on said lower section adjacent to the open rim thereof for preventing egress of the agitator from the lower section when the latter is inverted for pouring of the plastic materials from such section.

4. A combined mixing and pouring device for plastic materials as set forth in claim 3 and wherein said retaining element is in the form of a rod extending in secant fashion across a portion of said open rim of the lower section.

5. A combined mixing and pouring device for plastic materials comprising: a composite two-part separable capsule-like container including an upper cup-shaped section and a lower cup-shaped section, each section presenting an end wall and an outstanding continuous side wall with a continuous open rim, the side wall of the lower section being telescopically receivable within the side wall of the upper section with a snug fit, said sections when telescopically assembled upon each other providing an internal variable volume mixing chamber for the plastic materials, there being a small venting opening in one wall of the upper section adapted to be manually closed by the pressure application thereto of the finger or other part of the hand of an operator, the assembled container, when subjected to a manual shaking operation with said opening closed in any selected position of telescopic relationship serving to intermix the plastic materials within the chamber, said sections when drawn apart so as to increase the volume of said variable volume mixing chamber and with said opening closed, serving to place the interior of the chamber under vacuum so as to express occluded gases from the plastic materials within the chamber, a weighted agitator disposed loosely within the telescopically assembled container and adapted to enhance the mixing action of the container during shaking of the latter, and a retaining rod extending in secant fashion across a portion of said open rim of the lower section for preventing egress of the agitator from the lower section when the latter is detached from the upper section and inverted for pouring purposes, a cup-shaped crown of elastomeric material fitting over the upper end of said upper section and bonded to the wall surfaces thereof, there being a venting opening in said crown in register with the venting opening in said end wall of the upper section, and a similar cup-shaped base of elastomeric material fitting over the lower end of said lower section.

6. A combined mixing and pouring device as set forth in claim 5 and including, additionally, a band of elastomeric material encircling the rim region of said upper section.

7. A combined mixing and pouring device as set forth in claim 6 and wherein said weighted agitator is in the form of a short length of threaded rod stock.

References Cited by the Examiner

UNITED STATES PATENTS

| | | | |
|---|---|---|---|
| 412,534 | 10/1889 | Otto | 220—44 |
| 1,231,098 | 6/1917 | Toelcke | 222—196.1 X |
| 2,299,182 | 10/1942 | Schoof | 220—8 |
| 2,902,191 | 9/1959 | Rhodes | 220—8 X |

LOUIS J. DEMBO, *Primary Examiner.*